United States Patent
Yao et al.

(10) Patent No.: US 7,879,954 B2
(45) Date of Patent: Feb. 1, 2011

(54) RESIN COMPOSITION AND RESIN MOLDED ARTICLE

(75) Inventors: Kenji Yao, Kanagawa (JP); Masahiro Moriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/212,265

(22) Filed: Sep. 17, 2008

(65) Prior Publication Data

US 2009/0247667 A1    Oct. 1, 2009

(30) Foreign Application Priority Data

Mar. 26, 2008 (JP) ............................. 2008-081437

(51) Int. Cl.
*C08G 63/08* (2006.01)
(52) U.S. Cl. ................. 525/450; 524/261; 524/267; 525/462; 525/464
(58) Field of Classification Search ................. 524/261, 524/267; 525/450, 462, 464
See application file for complete search history.

(56) References Cited

FOREIGN PATENT DOCUMENTS

| EP | 1792941 | * | 6/2007 |
| JP | A-09-095606 | | 4/1997 |
| JP | 2000-129109 | | 5/2000 |
| JP | A-2005-048067 | | 2/2005 |
| JP | 2005-060637 | | 3/2005 |
| JP | 2006-052239 | | 2/2006 |
| JP | 2008-037965 | | 2/2008 |
| WO | WO 2005/075564 | | 8/2005 |

OTHER PUBLICATIONS

Akio et al., English Translation of JP 2008-037965 [online], accessed via the Internet [retrieved on Aug. 24, 2009], URL: <http://www19.ipdl.inpit.go.jp/PA1/cgi-bin/PA1INDEX>.*
Odian, G.; Principles of Polymerization; Wiley & Sons, Inc, 2004; p. 1-24.*
Sheet 1, Product information for TARFLON® Polycarbonate [online], accessed via the Internet [retrieved on Aug. 24, 2009], URL: <http://www.idemitsu.com/products/petrochemicals/engineering/index.html>.*
Sheet 2, Property data for polycarbonate of BPA [online], accessed via the Internet [retrieved on Aug. 24, 2009], URL: <http://www.polymerprocessing.com/polymers/PC.html>.*
Ko, F.; Palmese, G.; Gogotsi, Y.; Want, A.; Proceedings of the American Society for Composites: Twentieth Technical Conference; DEStech Publications, Inc., 2005; p. 76-77.*
Office Action issued in JP Application No. 2008-081437 on May 25, 2010 (with English translation).

* cited by examiner

*Primary Examiner*—David Wu
*Assistant Examiner*—Robert Jones, Jr.
(74) *Attorney, Agent, or Firm*—Oliff & Berridge, PLC

(57) ABSTRACT

A resin composition contains (A) an aliphatic polyester as a first polymer, (B) a second polymer having a higher glass transition temperature than the first polymer, and (C) a silicone oil.

12 Claims, 3 Drawing Sheets

RESIN COMPOSITION AND RESIN MOLDED ARTICLE

CROSS-REFERENCE TO RELATED APPLICATIONS

This application is based on and claims priority under 35 USC 119 from Japanese Patent Application No. 2008-081437 filed on Mar. 26, 2008.

BACKGROUND

1. Technical Field

This invention relates to a resin composition and a resin molded article.

2. Related Art

Using an eco-friendly, biodegradable resin as a material of resin molded articles for electric/electronic equipment and appliances has recently been studied from the standpoint of environmental protection. Inter alia, polylactic acid that can be produced from corn and other materials with no use of petroleum has been attracting attention. Polylactic acid, however, is generally inferior to general-purpose plastics made from petroleum in mechanical strength and heat resistance.

SUMMARY

According to an aspect of the invention, there is provided a resin composition comprising (A) an aliphatic polyester as a first polymer, (B) a second polymer having a higher glass transition temperature than the first polymer, and (C) a silicone oil.

BRIEF DESCRIPTION OF THE DRAWINGS

Exemplary embodiment(s) of the present invention will be described in detail based on the following figures, wherein.

DESCRIPTION OF REFERENCE NUMERALS

Figure 1:
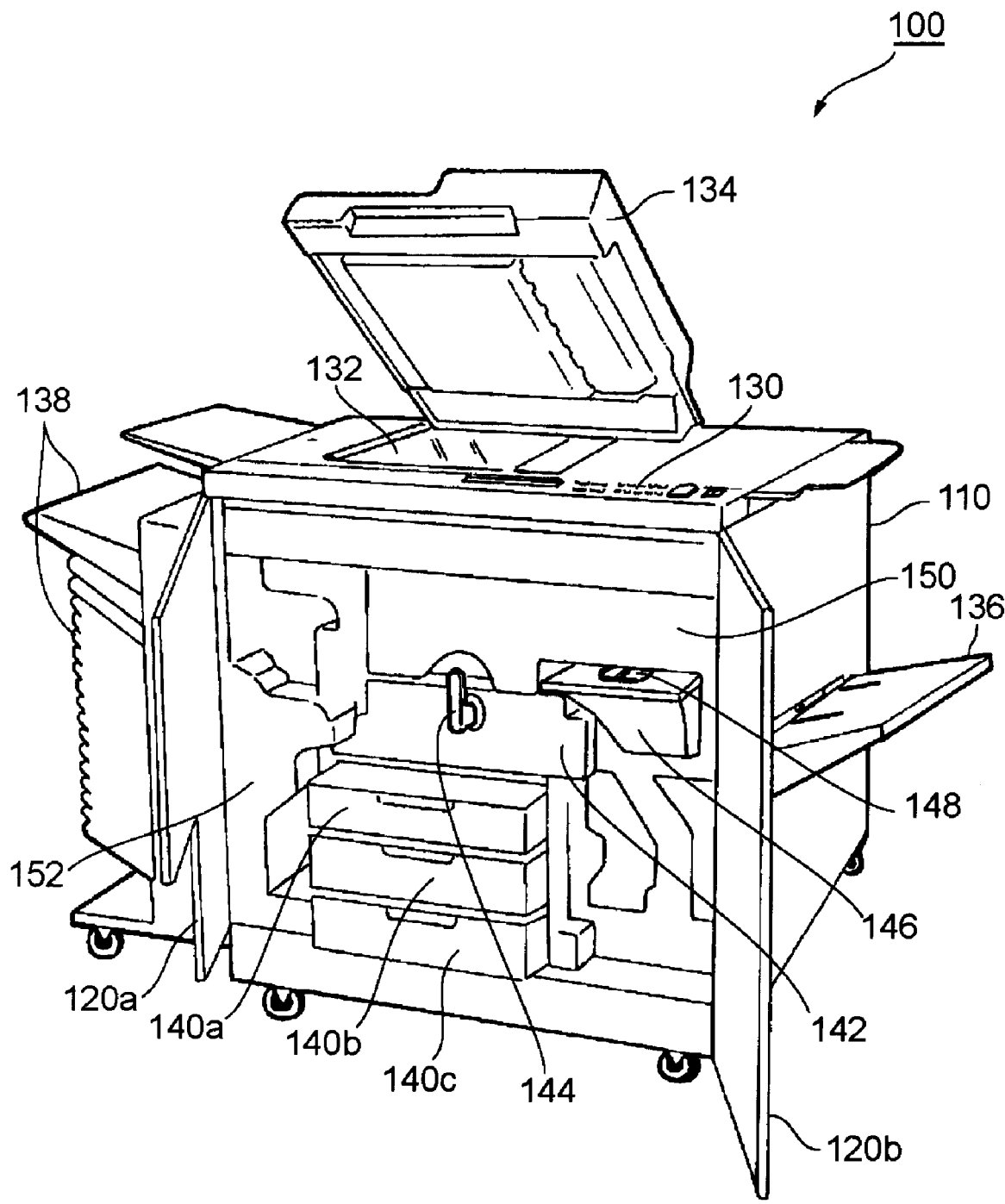
FIG. 1 is a perspective of an image forming apparatus having an electronic/electric part according to an embodiment of the resin molded article according to the invention.

10 Interior cover
100 Image forming apparatus
110 Main body
120a, 120b Front cover
136 Paper feed tray
138 Catch tray
142 Process cartridge
150, 152 Chassis

DETAILED DESCRIPTION

The present invention will be described with reference to its preferred embodiments.

I. Resin Composition

The resin composition according to the first aspect of the invention comprises (A) an aliphatic polyester as a first polymer, (B) a second polymer having a higher glass transition temperature than the first polymer, and (C) a silicone oil.

The term "glass transition temperature" as referred to with respect to the aliphatic polyester (A) and the second polymer (B) denotes a mid-point glass transition temperature (Tgm) measured as follows. A thermogram is obtained using a differential scanning calorimeter (DSC-60, from Shimadzu Corp.) at a heating rate of 10° C./min. The mid-point of the two shoulders obtained from the peak assigned to glass transition by a slope-tangent method is taken as a glass transition temperature.

When a conventional resin composition containing an aliphatic polyester as a first polymer and a second polymer having a higher glass transition temperature than the first polymer is molded, the resulting molded article suffers from mottle (e.g., a marbled appearance). This is because, the inventors believe, the aliphatic polyester having relatively higher flowability becomes a matrix while the second polymer forms incompatible domains called islands, thereby making a so-called sea-island structure, and the incompatible domains are liable to have a size distribution from small to large. The inventors also consider that the size distribution of the incompatible domains also reduces the fidelity of mold surface reproduction on a molded article, which can allow stains to accumulate on the molded article.

In contrast, the resin composition of the invention that contains silicone oil reduces occurrence of mottling. It is considered that the existence of the silicone oil in the interface between the aliphatic polyester (A) and the second polymer (B) allows for the aliphatic polyester (A) and the second polymer (B) joining to each other in a regular manner thereby to prevent the incompatible domains from varying in size. This appears to reduce the surface mottling. Although use of silicone oil as a release improver is known, there is no report on use of silicone oil in controlling the incompatible domain size. Accordingly, the above mentioned effect of incorporating silicone oil into the combination of an aliphatic polyester (A) and a second polymer (B) is unpredictable.

It is a known technique to elevate the glass transition temperature of an aliphatic polyester molded article by incorporating a second polymer into the aliphatic polyester. Nevertheless, because physical properties of the resulting molded article such as impact strength are easily influenced by the mutual dispersibility of the two resins to be combined, it is not always easy to secure sufficient impact strength simply by polymer blend control. According to the invention, in contrast, the existence of the silicone oil in the interface between the aliphatic polymer (A) and the second polymer (B) enables not only controlling the size distribution of the incompatible domains in a molded article but also sufficiently improving impact strength.

In addition to the above, the resin composition of the invention provides a molded article with sufficient flame retardancy, probably for the following reason. Since silicone oil exists in the interface between the aliphatic polyester (A) and the second polymer (B), a layer of carbonized silicone oil will be distributed uniformly in the molded article, which is believed to contribute to the development of flame retardancy.

While the aliphatic polyester (A) is not particularly limited, biodegradable aliphatic polyesters, particularly those of plant origin are preferred. Examples of preferred aliphatic polyesters include polylactic acid, polyhydroxybutyric acids (e.g., poly(3-hydroxybutyric acid), polybutylene succinate, polybutylene adipate, polybutylene succinate adipate, polyethylene succinate, polyethylene adipate, polypropylene succinate, polypropylene adipate, polypropylene succinate adipate, polyhexylene succinate, and polyhexylene adipate. Particularly preferred of them is polylactic acid having more functional groups per unit volume than others from the viewpoint of compatibility with silicone oil. The aliphatic polyesters may be used either individually or as a combination of two or more thereof. Aliphatic co-polyesters composed of two or more monomers of the above recited polyesters are useful as well.

The aliphatic polyester (A) preferably has a weight average molecular weight of about 5,000 to about 200,000, more preferably about 30,000 to about 120,000. Using an aliphatic polyester having a weight average molecular weight less than about 5,000 tends to result in reduction of mechanical strength. Using an aliphatic polyester having a weight average molecular weight more than about 200,000 tends to result in reduced flowability, i.e., reduced moldability.

The term "weight average molecular weight" as used herein with respect to the aliphatic polyester (A) refers to a weight average molecular weight measured by gel permeation chromatography (GPC) using, for example, HLC-8320GPC from Tosoh Corp. In the measurement, a sample is dissolved in deuterochloroform in a concentration of 0.1 mass %, and the sample solution is subjected to GPC to determine the weight average molecular weight of the aliphatic polyester separated from the solution.

The aliphatic polyester content in the resin composition is preferably about 30% to about 90% by mass, more preferably about 50% to about 90% by mass. A resin composition having an aliphatic polyester content less than about 30% is liable to cause increased environmental burden. A molded article obtained from a resin composition with an aliphatic polyester content exceeding about 90% tends to have reduced heat resistance and impact strength.

Any polymer having a higher glass transition temperature than the aliphatic polyester (A) can be used as the second polymer (B). Examples of polymers preferred as the second polymer (B) include polycarbonate resins, aromatic polyester resins, polyarylate resins, acrylic polymers, polystyrene resins, ABS resins (acrylonitrile-butadiene-styrene copolymers), polyamide resins, and polyurethane resins.

Examples of the polycarbonate resins are bisphenol A polycarbonate, bisphenol S polycarbonate, biphenyl polycarbonate, and copolymers thereof. Examples of the aromatic polyester resins include polyethylene terephthalate, polypropylene terephthalate, polybutylene terephthalate, polyethylene naphthalate, and copolymers thereof. Examples of the polyarylate resins include bisphenol A/terephthalic acid polyarylate, bisphenol S/terephthalic acid polyarylate, biphenyl/terephthalic acid polyarylate, bisphenol A/naphthalenedicarboxylic acid polyarylate, and copolymers thereof. Examples of the acrylic polymers include polymethyl methacrylate, polybutyl methacrylate, and copolymers thereof. The ABS resins may have a varied copolymerization ratio of acrylonitrile, butadiene, and styrene, etc. The polyamide resins are exemplified by 6-nylon, 6,6-nylon, and their copolymers.

Examples of the polystyrene resins include polystyrene, high impact polystyrene (HIP), and acrylonitrile-styrene (AS) resins. The polyurethane resins are exemplified by triisocyanate polyurethane and tetraisocyanate polyurethane.

Of the polymers recited above polycarbonate resins are preferred as a second polymer (B) in terms of compatibility with the aliphatic polymer (A) and a silicone oil (C). The second polymer (B) may be of a single kind or a combination of two or more kinds.

The weight average molecular weight of the second polymer (B) is preferably, but not limited to, about 5,000 to about 100,000, more preferably about 10,000 to about 50,000. Using a polymer with a lower molecular weight as a second polymer (B) tends to reduce the mechanical strength of the molded article. Using a polymer with a higher molecular weight as a second polymer (B) tends to reduce the flowability, i.e., moldability of the resin composition.

The term "weight average molecular weight" as used herein with respect to the second polymer (B) refers to a weight average molecular weight measured by GPC using, for example, HLC-8320GPC from Tosoh Corp. In the measurement, a sample is dissolved in deuterochloroform in a concentration of 0.1 mass %, and the sample solution is subjected to GPC to determine the weight average molecular weight of the aliphatic polyester separated from the solution.

The content of the second polymer (B) in the resin composition is preferably about 10% to about 60% by mass, more preferably about 30% to about 50% by mass. A molded article obtained from a resin composition having a second polymer content less than about 10% is liable to have reduced heat resistance. A resin composition with a second polymer content exceeding about 60% tends to have reduced mold surface reproducibility and to result in a mottled, uneven appearance such as a marbled appearance.

The resin composition preferably has an aliphatic polyester (A) to second polymer (B) ratio of about 20/80 to about 80/20 by mass. With the (A) to (B) mass ratio being in the preferred range, the resin composition achieves a high advantage of eco-friendliness (i.e., a high proportion of material of plant origin) while producing a molded article having sufficiently high impact strength and heat resistance and sufficiently reduced unevenness of surface appearance with high fidelity of mold surface reproduction.

Examples of the silicone oil (C) that can be used in the invention include straight silicone oils such as dimethyl silicone oil, methyl phenyl silicone oil, and diphenyl silicone oil; and modified silicone oils such as amino-modified silicone oils, epoxy-modified silicone oils, carboxyl-modified silicone oils, and phenol-modified silicone oils. Preferred of them are modified silicone oils including amino-modified silicone oils, carboxyl-modified silicone oils, epoxy-modified silicone oils, and phenol-modified silicone oils for their high reactivity with the aliphatic polyester (A) and the second polymer (B). To use such a modified silicone oil ensures prevention of mottling and further improves heat resistance of the molded article.

The silicone oil content in the resin composition is preferably about 0.1% to about 5% by mass, more preferably about 1% to about 3% by mass. A silicone oil content less than about 0.1 mass % tends to result in reduction of mold surface reproducibility and flame retardance of the molded article. Addition of more than about 5 mass % silicone oil tends to result in reduction of heat resistance and impact strength of the molded article.

The silicone oil content is preferably about 5 to about 10 parts by mass per 100 parts by mass of the aliphatic polyester (A) so as not to impair the flowability of the aliphatic polyester (A).

The resin composition of the invention may contain one or more flame retardants selected from phosphorus flame retardants, silicone flame retardants, and inorganic flame retardants to provide a molded article with improved mechanical strength as well as high flame retardance. Examples of the phosphorus flame retardants include condensed phosphoric esters, melamine polyphosphate, aluminum polyphosphate, ammonium polyphosphate, red phosphorus, and phosphinic acid metal salts such as aluminum diethylphosphinate and zinc diethylphosphinate. Examples of the silicone flame retardants include silicone powder, polymethylsiloxane, and polyphenylsiloxane. The inorganic flame retardants are exemplified by magnesium hydroxide and aluminum hydroxide.

The amount of the flame retardant to be added is preferably about 0.5% to about 30%, more preferably about 5% to about 15%, by mass based on the resin composition. Less than about 0.5% of the flame retardance may be insufficient to produce substantial effect of addition. Addition of more than about 30% of the flame retardant is liable to reduce the mechanical strength and heat resistance of the molded article.

Preferred of the recited flame retardants is a condensed phosphoric ester. Addition of a condensed phosphoric ester improves moldability. Commercially available condensed phosphoric esters may be made use of, including PX-200, PX-201, PX-202, CR-733S, CR-741, and CR747 all available from Daihachi Chemical Industry Co., Ltd.

The resin composition may further contain a hydrolysis inhibitor. A molded article obtained from the resin composition containing a hydrolysis inhibitor exhibits not only excellent resistance to hydrolysis but improved impact strength. Useful hydrolysis inhibitors are exemplified by carbodiimide compounds and oxazoline compounds. Carbodiimide compounds are preferred for their high reactivity and relatively short molecular chain, which are advantageous for obtaining good flowability and moldability. The carbodiimide compound may be monofunctional or polyfunctional. Bi- to tetrafunctional carbodiimide compounds are preferred in terms of heat resistance, impact strength, flame retardance, and mold surface reproduction.

The amount of the hydrolysis inhibitor to be used is preferably about 0.1% to about 4%, more preferably about 0.25% to about 1.2%, by mass based on the resin composition. Addition of less than about 0.1% tends to result in insubstantial effect. Addition of more than about 4% can result in reduction of flowability, i.e., poor moldability.

If desired, the resin composition may contain additives other than the flame retardant and the hydrolysis inhibitor, such as a colorant, an antioxidant, an antistatic agent, a parting agent, a weathering agent, a light stabilizer, and so forth.

The resin composition is usually supplied in the form of a resin compound obtained by, for example, metering and kneading the aliphatic polyester (A), the second polymer (B), the silicone oil (C), and, if desired, necessary additives such as a flame retardant and a hydrolysis inhibitor in a kneading machine such as a twin screw extruder.

The kneading temperature is preferably about 180° to about 260° C.

The resin composition of the invention provides a highly eco-friendly molded article having sufficiently high impact strength and heat resistance and sufficiently reduced mottle with higher fidelity of mold surface reproduction than achieved by conventional techniques. Therefore, the resin composition is suitable in the production of a variety of resin molded articles including housings, chassis, and parts of office equipment and housings, chassis, and parts of home appliances and electric/electronic equipment. The effects described above are manifested even in the case where the resin composition has a high proportion of material of plant origin, e.g., 25% to 80% by mass of polylactic acid.

II. Resin Molded Article

The resin molded article according to the second aspect of the present invention comprises (A) an aliphatic polyester as a first polymer, (B) a second polymer having a higher glass transition temperature than the first polymer, and (C) a silicone oil. The molded article can be obtained by molding the resin composition of the invention described supra. Specifically, predetermined quantities of the aliphatic polyester (A) the second polymer (B), the silicone oil (C), and, if desired, necessary additives such as a flame retardant and a hydrolysis inhibitor are compounded, for example, by kneading in a kneading machine such as a twin screw extruder. The kneading temperature is preferably about 180° to about 260° C.

The resulting compound is molded by injection molding, extrusion, blow molding, hot pressing, and the like to produce the molded article of the invention. Injection molding is preferred to obtain high productivity and high fidelity of mold surface reproduction.

The molding conditions are not restricted as long as the effects of the invention are not ruined. In the case of injection molding, for instance, the injection temperature is preferably about 180° to about 280° C., and the mold temperature is preferably about 20° to about 70° C.

When the molded article is dissected between a surface portion and a central portion, it is preferred that the ratio of the mass (Bs) of the second polymer (B) to the mass (As) of the aliphatic polyester (A) in the surface portion be not more than double the ratio of the mass (Bc) of the second polymer (B) to the mass (Ac) of the aliphatic polyester (A) in the central portion. This represents that the difference in size distribution of the islands (incompatible domains) of the second polymer (B) between the surface portion and the central portion is small.

Figure 3:
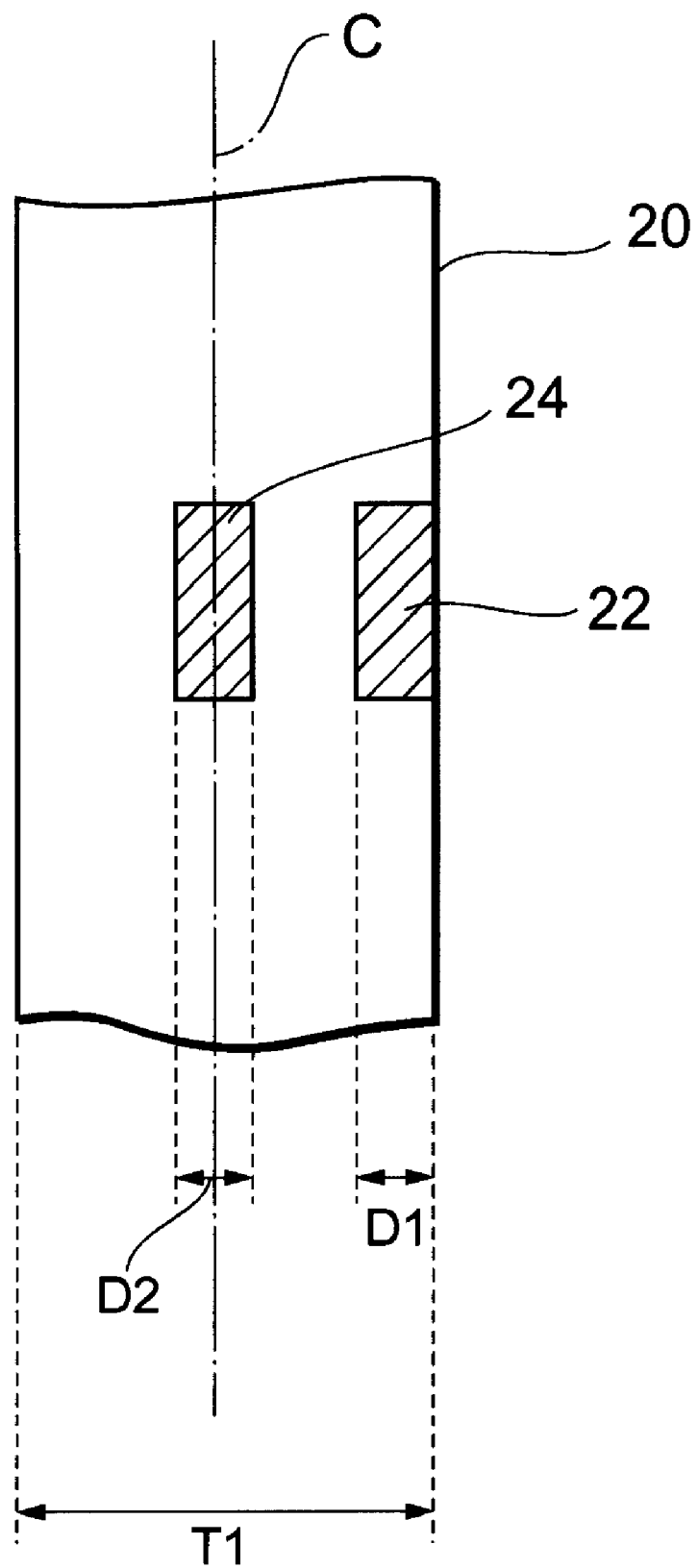
FIG. 3 illustrates a surface portion and a central portion of a molded article.

The term "surface portion" as used herein denotes a portion from the surface of a resin molded article to a depth corresponding to 10% of the thickness of the molded article. The term "central portion" as used herein denotes a portion extending from the midpoint of the thickness of the molded article in the thickness direction to a distance corresponding to ±5% of the thickness of the molded article. The surface portion and the central portion will be described with reference to the accompanying drawing. FIG. 3 is a fragmentary cross-section of a molded article 20 according to the invention. The molded article 20 is a plate having a thickness T1 (mm) and a centerline C formed by connecting midpoints of the plate thickness. A surface portion 22 of the molded article 20 is a portion from the surface to a depth D1 (mm) which corresponds to 10% of T1 (mm). A central portion 24 of the molded article 20 is a portion extending from the centerline C in opposite directions across the thickness to a distance D2/2 (mm). D2 (mm) is 10% of T1 (mm).

The ratios of Bs to As (Bs/As) and of Bc to As (Bc/Ac) of the resin molded article 20 are obtained, for example, as follows.

Measurement of Bs/As:

A D1 (mm) thick specimen is scraped off from the surface of the molded article 20 with a microtome over an area, e.g., of 10 mm$^2$. The specimen (unit resin) is fractionated on a GPC (HLC-8320GPC from Tosoh Corp.) into an aliphatic polyester (A) and a second polymer (B). The weight As of the aliphatic polyester (A) and the weight Bs of the second polymer (B) per unit resin are measured, from which a Bs/As is calculated.

Measurement of Bc/Ac:

The molded article 20 is destroyed to cut a specimen off the central portion thereof with a microtome. The specimen extends from the midpoint of the thickness to the opposite directions across the thickness by D2/2 mm over an area, e.g., of 10 mm$^2$. The specimen (unit resin) is analyzed in the same manner as above to obtain a Bc/AC.

The resin molded article of the invention is suited for applications to electronic/electric equipment, home appliances, office equipment, contains, automotive interiors, and the like. More specifically, the molded article is applicable to housings, chassis, and parts of appliances and electronic/electric equipment, wrap films, cases of CD-ROMs and DVDs, eating utensils, food trays, drink bottles, drug wrapping materials, and so forth. The molded article is particularly suited as an electronic/electric equipment part for the following reasons. Electronic/electric equipment parts often have a complicated shape. Besides, the equipment and the parts therefore are often heavy so that they are required to have high impact strength and surface impact strength. The molded article of the invention sufficiently satisfies these requirements.

III. Application

Application of a molded article according to the invention will be described with particular reference to application as an office equipment part. An office equipment part according to the invention may be composed either wholly or in part of the above described resin molded article of the invention.

FIG. 1 is a perspective view from the front of an image forming apparatus 100 having a part as one embodiment of the resin molded article of the invention. The image forming apparatus 100 includes a main body 110 and front covers 120a and 120b. The front covers 120a and 120b are openable to allow an operator to perform necessary operations inside the apparatus such as toner replenishment, process cartridge replacement, and fixing a paper jam. FIG. 1 illustrates the apparatus 100 with the front covers 120a and 120b open.

The main body 110 has on the upper side thereof a control panel 130 for operator input of image formation job parameters such as a media size and a number of copies, a copy glass 132 on which a document to be copied is placed, and an automatic document feeder 134 that feeds a document to be copied onto the copy glass 132 automatically. The main body 110 has an image reading unit that scans an image of an original document placed on the copy glass 132 to obtain data of the image, which are to be sent to an image forming unit via a controller. The image reading unit and the controller are mounted in a chassis 150 that constitutes a part of the main body 110. The image forming unit is a detachable process cartridge 142, which is also mounted inside the chassis 150. The process cartridge 142 is attached or detached by turning a latch lever 144.

A toner container 146 is fitted into the chassis 150 of the main body 110. The toner container 146 has a toner feed port 148, through which it is replenished with fresh toner. The toner in the toner container 146 is supplied to a developing unit.

The main body 110 has, in the lower part thereof, paper feed cassettes 140a, 140b, and 140c. The main body 110 has a plurality of pairs of feed rolls arranged therein to form a paper transport path, through which a sheet of paper from a paper feed cassette travels to the upper image forming unit. A paper feed mechanism is disposed near the end of the paper transport path to separate and forward sheets of paper one by one from a stack of sheets in a paper feed cassette to the paper transport path. A manual paper feed tray 136 is provided on a side of the main body 110, through which a sheet of paper may be fed.

Sheets having an image formed thereon in the image forming unit are successively transported to between two fixing rolls kept in contact with each other and supported by a chassis 152 that constitutes a part of the main body 110 and discharged from the main body 110. The main body 110 has catch trays 138 for receiving printed sheets on the side opposite to the paper feed tray 136.

The front covers 120a and 120b of the image forming apparatus 100 are subject to high loads such as the stress and impact at opening and closing, vibration during image formation, and the heat generated in the image forming apparatus. The process cartridge 142 is subject to high loads such as the shock at attachment and detachment, vibration during image formation, and the heat generated in the image forming apparatus. The chassis 150 and 152 are subject to high loads such as vibration during image formation and the heat generated in the image forming apparatus. In addition, these parts can be seen by an operator, and they easily get dusty. Therefore, the resin molded articles of the present invention are suited as the front covers 120a and 120b, the casing of the process cartridge 142, and the chassis 150 and 152 used in the image forming apparatus 100.

The present invention will now be illustrated in greater detail with reference to Examples, but it should be understood that the invention is not construed as being limited thereto.

EXAMPLES 1 TO 15 AND COMPARATIVE EXAMPLES 1 TO 5

The materials shown in Tables 1 and 2 are compounded in a compounding ratio shown in the Tables by means of a twin screw extruder (TEM58SS, from Toshiba Machine Co., Ltd.) at a cylinder temperature of 220° C.

The materials shown in Tables 1 and 2 are as follows.
(1) Polylactic acid: TERRAMAC TE 4000 (from Unitika Ltd.; weight average molecular weight: 60000; glass transition temperature: 58° C.)
(2) Polycarbonate: CALIBRE S 200 (from Sumitomo Dow Limited; weight average molecular weight: 22000; glass transition temperature: 140° C.)
(3) Silicone oil
  KF-968 (from Shin-Etsu Silicone Co., Ltd.)
  KF-877 (amino-modified silicone from Shin-Etsu Silicone)
  X-22-2000 (epoxy-modified silicone from Shin-Etsu Silicone)
  X-22-3701E (carboxy-modified silicone from Shin-Etsu Silicone)
(4) Flame retardant
  PX-200 (condensed phosphoric ester from Daihachi Chemical Industry Co., Ltd.)
  AP422 (aluminum polyphosphate from Clariant)
  MPP-B (melamine polyphosphate from Sanwa Chemical Co., Ltd.)
(5) Carbodiimide: CARBODILITE LA-1 from Nisshinbo Industries, Inc.
(6) Talc: MS-P from Nippon Talc Co., Ltd.
(7) Parting agent: VPG861 (stearic acid based parting agent, from Miki Chemical Industry & Co., Ltd.)

Each of the resulting resin compounds is injection molded using an injection molding machine NEX150 (from Nissei Plastic Industrial Co., Ltd.) at a cylinder temperature of 220° C. and a mold temperature of 50° C. to prepare ISO multipurpose dumbbell shaped specimens (common to ISO 527 tensile test and ISO 178 bending test; 4 mm thick and 10 mm wide in the narrow section) and a UL test specimen for UL-94 V test (0.8 mm thick). Evaluations of molded articles of the resin compounds are conducted by measuring Charpy impact strength and thermal distortion temperature and carrying out a flame retardance test using these specimens in accordance with the test methods described below. The results obtained are shown in Table 3.

(a) Charpy Impact Strength
One of the dumbbell specimens is notched and tested in accordance with ISO 179 on an impact tester DG-C from Toyo Seiki Kogyo Co., Ltd. to measure a Charpy impact strength ($kJ/m^2$).

(b) Heat Distortion Temperature
The other dumbbell specimen is cut to remove both chucking parts and subjected to a heat distortion test in accordance with ISO 75 to measure a heat distortion temperature under a load of 0.45 MPa and 1.80 MPa.

(c) Flame Retardance Test
UL V test is carried out using the UL test specimen in accordance with the UL-94 specification. The flame retardance is rated "V-0", "V-1", or "V-2" in the descending order of flame retardance. A specimen that fails to attain any of the above three ratings is rated "burn".

TABLE 1

| | Aliphatic Polyester (A) Polylactic Acid TERRAMAC | Second Polymer (B) Polycarbonate | Silicone Oil | | | | Flame Retardant | | |
|---|---|---|---|---|---|---|---|---|---|
| | TE-4000 | CALIBRE S-200 | KF-968 | KF-877 | X-22-2000 | S-22-3701E | P-200 | AP422 | MP-8 |
| Example 1 | 39 | 58 | | 3 | | | | | |
| Example 2 | 39 | 58 | | | 3 | | | | |
| Example 3 | 39 | 58 | | | | 3 | | | |
| Example 4 | 36 | 53 | 1 | | | | 10 | | |
| Example 5 | 36 | 53 | | 1 | | | 10 | | |
| Example 6 | 36 | 53 | | | 1 | | 10 | | |
| Example 7 | 36 | 53 | | | | 1 | 10 | | |
| Example 8 | 36 | 53 | | | | 1 | | 10 | |
| Example 9 | 36 | 53 | | | | 1 | | | 10 |

TABLE 2

| | Aliphatic Polyester (A) Polylactic Acid TERRAMAC | Second Polymer (B) Polycarbonate | Silicone Oil | | Flame Retardant | | Parting Agent | Carbo-diimide CARBODILIT | Talc |
|---|---|---|---|---|---|---|---|---|---|
| | TE-4000 | CALIBRE S-200 | KF-877 | X-22-3701E | PX-2000 | AP422 | VPG 861 | LA-1 | MS-P |
| Example 10 | 35 | 53 | | 1 | 10 | | | 1 | |
| Example 11 | 30 | 48 | 1 | | 10 | | | 1 | 10 |
| Example 12 | 90 | 6 | 1 | | 2 | | | 1 | |
| Example 13 | 35.5 | 53 | 0.5 | | 10 | | | 1 | |
| Example 14 | 34 | 50 | 5 | | 10 | | | 1 | |
| Example 15 | 40 | 56 | 4 | | | | | | |
| Comp. Example 1 | 40 | 60 | | | | | | | |
| Comp. Example 2 | 36 | 54 | | | 10 | | | | |
| Comp. Example 3 | 36 | 54 | | | | 10 | | | |
| Comp. Example 4 | 32 | 47 | | | 10 | | | 1 | 10 |
| Comp. Example 5 | 36 | 53 | | | 10 | | 1 | | |

TABLE 3

| | Charpy Impact Strength (kJ/m$^2$) | Heat Distortion Temperature (° C.) | | UL V Test (0.8 mm) |
|---|---|---|---|---|
| | | 0.45 Mpa | 1.80 MPa | |
| Example 1 | 8 | 125 | 110 | V-2 |
| Example 2 | 7 | 128 | 115 | V-2 |
| Example 3 | 8 | 125 | 118 | V-2 |
| Example 4 | 5 | 79 | 70 | V-2 |
| Example 5 | 5 | 82 | 71 | V-2 |
| Example 6 | 5 | 81 | 71 | V-2 |
| Example 7 | 5 | 82 | 72 | V-2 |
| Example 8 | 6 | 118 | 79 | V-2 |
| Example 9 | 4 | 85 | 72 | V-2 |
| Example 10 | 7 | 88 | 73 | V-2 |
| Example 11 | 15 | 85 | 72 | V-2 |
| Example 12 | 7 | 123 | 108 | V-2 |
| Example 13 | 5 | 82 | 73 | V-2 |
| Example 14 | 7 | 85 | 75 | V-2 |
| Example 15 | 9 | 120 | 100 | V-2 |
| Comp. Ex. 1 | 10 | 125 | 110 | burn |
| Comp. Ex. 2 | 5 | 70 | 60 | V-2 |
| Comp. Ex. 3 | 4 | 72 | 61 | V-2 |
| Comp. Ex. 4 | 7 | 70 | 61 | burn |
| Comp. Ex. 5 | 5 | 70 | 62 | V-2 |

EXAMPLES 16 TO 30 AND COMPARATIVE EXAMPLES 6 TO 10

Figure 2A:
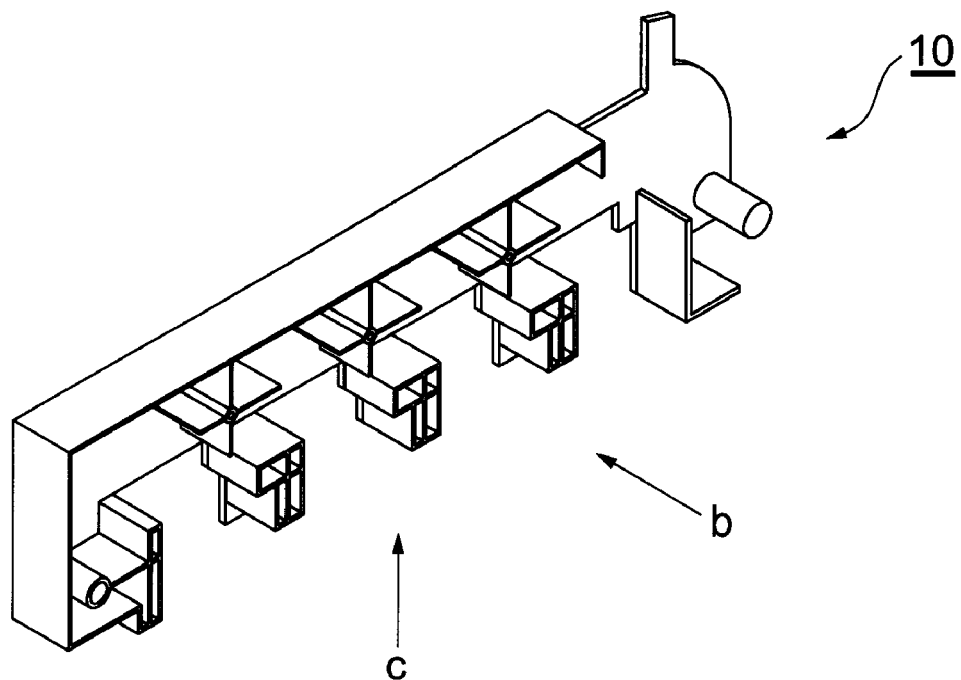
FIG. 2A, FIG. 2B, and FIG. 2C illustrate the shape of a molded article (interior cover) prepared in Examples.
Figure 2B:
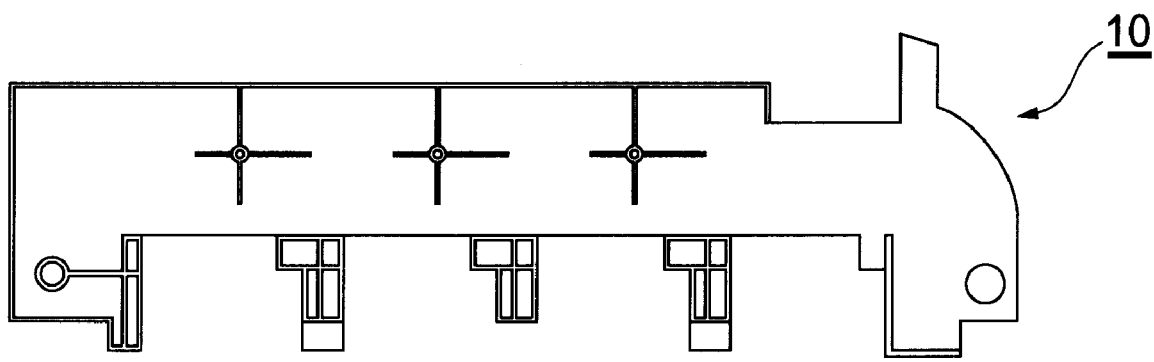
Figure 2C:

Each of the resin compounds of Examples 1 to 15 and Comparative Examples 1 to 5 is injection molded using an injection molding machine NEX 7000 (from Nissei Plastic Industrial Co., Ltd.) at a resin temperature of 240° C. and a mold temperature of 50° C. to prepare a molded part 10 illustrated in FIG. 2 (an interior cover of an image forming apparatus). FIG. 2(*a*) is a perspective of the part 10. FIGS. 2(*b*) and 2(*c*) are each a view of the part 10 seen from the arrows b and c, respectively.

The part 10 is evaluated as follows. The results of evaluation are shown in Table 4.

(a) Mottle

The surface of the part 10 is visually inspected for mottle and rated as follows.

A: No mottle is observed.

B: Mottle including a marbled appearance is observed in an area of 5% or less of the total surface area of the part.

C: Mottle including a marbled appearance is observed in an area exceeding 5% and less than 30% of the total surface area of the part.

D: Mottle including a marbled appearance is observed in an area of 30% or more of the total surface area of the part.

(b) Mold Surface Reproducibility

The surface roughnesses of the mold (Ra1) and the molded part (Ra2) are measured with a laser profilometer, from which a mold surface reproducibility percentage is calculated according to equality:

Mold surface reproducibility (%)=(Ra2/Ra1)×100

(c) Toner Adhesion

An image forming apparatus (DOCUCENTRE 400) having the molded part 10 (interior cover) fitted therein is operated using a magenta toner for DOCUCENTRE 400 (from Fuji Xerox) to obtain 10,000 prints. After the printing test, the part (interior cover) 10 used in the image forming apparatus is visually inspected for toner adhesion as compared with the same molded part 10 that is not used for the test. When a toner stain persisted even after the part 10 is wiped with cloth 10 times, the part 10 is scored as having toner adhesion.

(d) Mass Ratio of Second Polymer (B) to Aliphatic Polyester (A)

(d-1) Mass Ratio in Surface Portion (Bs/As)

A 0.24 mm thick specimen is scraped off from the surface of a 2.4 mm thick part of the molded part 10 with a microtome over an area of 10 mm². The specimen (unit resin) is fractionated on a GPC (HLC-8320GPC from Tosoh Corp.) to obtain a fraction with a weight average molecular weight (Mw) of around 60,000 that corresponds to the polylactic acid as an aliphatic polyester (A) and a fraction with an Mw of around 22,000 that corresponds to the polycarbonate as a second polymer (B) The weight As of the aliphatic polyester (A) and the weight Bs of the second polymer (B) per unit resin are measured, from which a Bs/As is calculated.

(d-2) Mass Ratio in Central Portion (Bc/Ac)

A 2.4 mm thick part of the molded part 10 is destroyed to cut a specimen having a thickness of 0.24 mm and an area of 10 mm² off the central portion thereof with a microtome such that the midpoint of the specimen thickness coincides with that of the molded part. The specimen (unit resin) is analyzed in the same manner as in (d-2) to obtain a Bc/Ac.

TABLE 4

|  | Resin Composition | Freedom from Mottle | Mold Surface Reproducibility (%) | Toner Adhesion | Surface Portion Mass Ratio (s) Bs/As | Inner Portion Mass Ratio (c) Bc/Ac | s/c |
|---|---|---|---|---|---|---|---|
| Example 16 | Example 1 | B | 99.8 | no | 1.4 | 1.2 | 1.2 |
| Example 17 | Example 2 | B | 99.5 | no | 1.6 | 1.3 | 1.2 |
| Example 18 | Example 3 | B | 99.7 | no | 1.5 | 1.4 | 1.1 |
| Example 19 | Example 4 | C | 99.6 | no | 1.5 | 1.4 | 1.1 |
| Example 20 | Example 5 | A | 99.8 | no | 1.6 | 1.4 | 1.1 |
| Example 21 | Example 6 | A | 99.7 | no | 1.4 | 1.3 | 1.1 |
| Example 22 | Example 7 | A | 99.6 | no | 1.5 | 1.4 | 1.1 |
| Example 23 | Example 8 | B | 99.5 | no | 1.6 | 1.3 | 1.2 |
| Example 24 | Example 9 | B | 99.6 | no | 1.5 | 1.4 | 1.1 |
| Example 25 | Example 10 | A | 99.6 | no | 1.6 | 1.3 | 1.2 |
| Example 26 | Example 11 | B | 99.8 | no | 1.5 | 1.4 | 1.1 |
| Example 27 | Example 12 | A | 99.6 | no | 0.11 | 0.09 | 1.2 |

|  | Resin Composition | Freedom from Mottle | Mold Surface Reproducibility (%) | Toner Adhesion | Surface Portion Mass Ratio (s) Bs/As | Central Portion Mass Ratio (c) Bc/Ac | s/c |
|---|---|---|---|---|---|---|---|
| Example 28 | Example 13 | A | 99.4 | no | 1.5 | 1.3 | 1.2 |
| Example 29 | Example 14 | C | 99.8 | no | 1.5 | 1.3 | 1.2 |
| Example 30 | Example 15 | C | 99.5 | no | 1.6 | 1.3 | 1.2 |
| Comp. Example 6 | Comp. Example 1 | D | 90.1 | yes | 4.2 | 1.2 | 3.5 |
| Comp. Example 7 | Comp. Example 2 | D | 88.5 | yes | 3.9 | 1.3 | 3 |
| Comp. Example 8 | Comp. Example 3 | D | 89.9 | yes | 4 | 1.2 | 3.3 |
| Comp. Example 9 | Comp. Example 4 | D | 89.8 | yes | 4.1 | 1.3 | 3.2 |
| Comp. Example 10 | Comp. Example 5 | D | 89.9 | yes | 3.6 | 1.2 | 3.3 |

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A resin composition comprising (A) an aliphatic polyester as a first polymer, (B) a second polymer having a higher glass transition temperature than the first polymer, and (C) a silicone oil;

wherein the silicone oil is present in an amount of from about 1% to about 3% by mass based on the resin composition;

wherein the aliphatic polyester is present in an amount of from about 30% to about 90% by mass based on the resin composition;

wherein the second polymer is present in an amount of from about 10% to about 60% by mass based on the resin composition; and wherein the aliphatic polyester is a polylactic acid, the second polymer is a polycarbonate resin, and the silicone oil is a straight silicone oil.

2. The resin composition according to claim 1, wherein the aliphatic polyester has a weight average molecular weight of from about 5000 to about 200000.

3. The resin composition according to claim 1, wherein the second polymer has a weight average molecular weight of from about 5000 to about 100000.

4. The resin composition according to claim 1, wherein the mass ratio of the aliphatic polyester to the second polymer is from about 20/80 to about 80/20.

5. A resin molded article comprising (A) an aliphatic polyester as a first polymer, (B) a second polymer having a higher glass transition temperature than the first polymer, and (C) a silicone oil;

wherein the silicone oil is present in an amount of from about 1% to about 3% by mass based on the resin composition;

wherein the aliphatic polyester is present in an amount of from about 30% to about 90% by mass based on the resin composition;

wherein the second polymer is present in an amount of from about 10% to about 60% by mass based on the resin composition; and wherein the aliphatic polyester is a polylactic acid, the second polymer is a polycarbonate resin, and the silicone oil is a straight silicone oil.

6. The resin molded article according to claim 5, wherein the molded article has a surface portion and a central portion, and the ratio of the mass (Bs) of the second polymer to the mass (As) of the aliphatic polyester in the surface portion is not more than double the ratio of the mass (Bc) of the second polymer to the mass (Ac) of the aliphatic polyester in the central portion.

7. The resin molded article according to claim 5, wherein the aliphatic polyester has a weight average molecular weight of from about 5000 to about 200000.

8. The resin molded article according to claim 5, wherein the second polymer has a weight average molecular weight of from about 5000 to about 100000.

9. The resin molded article according to claim 5, wherein the second polymer is present in an amount of from about 10% to about 60% by mass based on the resin composition.

10. The resin molded article according to claim 5, wherein the mass ratio of the aliphatic polyester to the second polymer is from about 20/80 to about 80/20.

11. The resin composition according to claim 1, wherein the straight silicone oil is at least one member selected from a group consisting of dimethyl silicone oil, methyl phenyl silicone oil, diphenyl silicone oil, carboxyl-modified silicone oils, and phenol-modified silicone oils.

12. The resin composition according to claim 5, wherein the straight silicone oil is at least one member selected from a group consisting of dimethyl silicone oil, methyl phenyl silicone oil, diphenyl silicone oil, carboxyl-modified silicone oils, and phenol-modified silicone oils.

* * * * *